Aug. 1, 1950 A. M. ALLEN 2,517,457

NURSING DEVICE

Filed May 27, 1946 3 Sheets-Sheet 1

Inventor:

Adda M. Allen,

By Cushman Darby & Cushman

Attorneys.

Aug. 1, 1950 A. M. ALLEN 2,517,457

NURSING DEVICE

Filed May 27, 1946 3 Sheets-Sheet 2

DISTENDED

COLLAPSED

Inventor:

Adda M. Allen,

By Cushman Darby & Cushman

Attorneys.

Aug. 1, 1950 A. M. ALLEN 2,517,457

NURSING DEVICE

Filed May 27, 1946 3 Sheets-Sheet 3

Inventor:

Adda M. Allen,

By Cushman Darby & Cushman

Attorneys.

Patented Aug. 1, 1950

2,517,457

UNITED STATES PATENT OFFICE 2,517,457

NURSING DEVICE

Adda M. Allen, Arlington, Va., assignor to Disposable Bottle Corporation, Washington, D. C., a corporation of Delaware Application May 27, 1946, Serial No. 672,474

7 Claims. (Cl. 215—11)

The present invention relates to nursing devices, being particularly concerned with the device commonly referred to as a nipple, but which usually includes a dome-shaped rubber structure which fits the end of a bottle and is more or less similar in appearance to the human breast, and an integral nipple portion extending centrally from this dome-shaped portion.

The several forms of nursing devices disclosed herein are particularly useful in association with a disposable container of the type described in my copending application Ser. No. 560,610 filed October 27, 1944, which issued as Patent No. 2,446,451, but they are not confined in their use to any particular form of container, as the means for connecting the devices with the container or bottle may be varied to suit the container with which they are used.

In the prior patents of this art, various constructions of nursing devices have been described having in mind approximating in their use, the action which takes place when a child nurses at its mother's breast. While some of the theories advanced seem reasonable, the actual physical structures of the devices did not fulfill these theories, nor approach the true action occurring when a child nurses at the mother's breast.

In general, I have found that prior art devices have failed principally because they resemble the human breast only in appearance, rather than in their capability of yielding and responding like the breast to the instinctive movements of the child's lips and tongue when performing the nursing action. I have further observed that the nursing devices available to the public over a considerable period of years and up to the present time, have made no provision for differences in size of an infant's mouth, as compared with that of a child some months old, nor have these devices taken into account the considerable variation in size, strength and vigor of different infants or babies of the same age. Therefore, as the art now stands, manufacturers provide only one relatively rigid nursing device for children of all sizes and all degrees of strength, and the children must accommodate themselves to the nursing device rather than the latter accommodating itself to the instinctive movements of the child.

In general, I have developed several forms of nursing devices which normally assume a contracted or relaxed condition, comparable to that of the mother's breast when the child is not nursing, but which will yield to the movements, pull, or nursing action of the child depending on his size and vigor, whereby a given device is useful for all babies, from the premature to the large and healthy child at an age when so-called bottle nursing is discontinued.

Among the objects of the invention indicated above, it is a purpose of the invention to provide a nursing device having a nipple which the infant can pull outwardly or distend with ease as he desires, and which nipple is capable of being elongated by the suction applied by the infant and by drawing additional material into the nipple proper from the areola portion of the device.

Included in the present invention is a novel form of connecting means whereby nursing devices of this or other well-known types may be sealed to and utilized in connection with disposable nursing containers described in my copending application referred to above, without providing relatively expensive rigid neck pieces.

In the drawings, which are illustrative of the several forms which the invention may take, and which are not intended to be restrictive:

Figure 1:
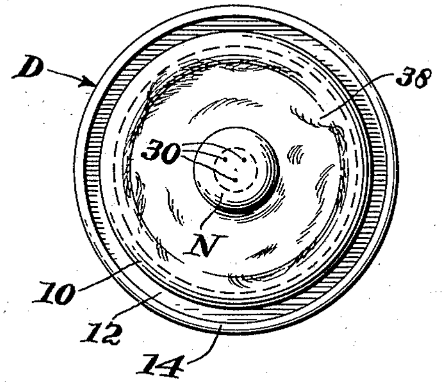
Figure 1 is a top plan view of one form of nursing device in its naturally collapsed condition.

Referring to Figure 1, the nursing device is indicated generally at D, same comprising a relatively small nipple portion N of medium rigidity, and with the usual outlet openings therein, and a dome-like (when distended) areola portion B of very great flexibility and yieldability. The device may be made of any appropriate yieldable and flexible material currently available, such as rubber or rubber compounds, synthetic compounds, etc., and is capable of being easily cleaned and sterilized after use, the material being such as will not contaminate the milk, formula, or any liquid commonly used in the feeding of babies. When I use the term rubber herein, I mean to include any of the above. While the areola portion of the device may have integral therewith a peripheral section of any desired form for attachment to rigid or flexible containers, I have provided the device in such form as to be capable of rapid and convenient attachment to flexible containers of the type disclosed in my copending application mentioned above. In this connection, the areola portion terminates in an annular, somewhat thick inner flange 10, the periphery being bent outwardly and upwardly as at 12 to terminate in an outer spaced upwardly directed circular flange 14. Flanges 10 and 14 define an intermediate annular space between them into which may be slipped a continuous circular rigid ring 16 of metal, plastic or other available material, which will give the lower periphery of the device a rigidity and resistance against compression in order that the upper open edge of a container of film-like (preferably transparent) material may be sealed thereto in liquid-tight relation.

Figure 5:
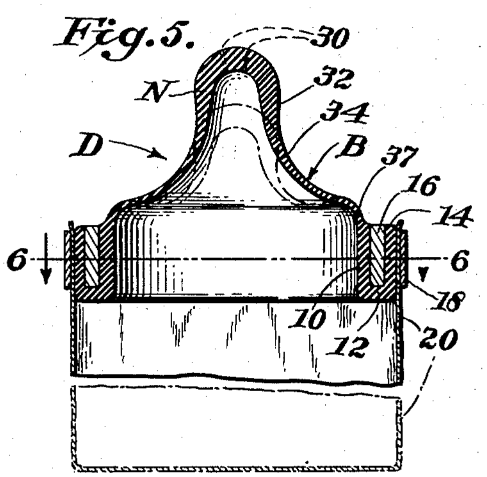
Figure 5 is a similar transverse sectional view of this device when distended by the nursing of a large or vigorous child.
Figure 7:
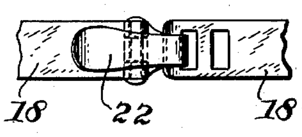
Figure 7 is a partial side elevational view showing one form of clamping ring and its locking connection which may be employed in securing this or a similar type of nursing device in sealing relation with a disposable container of the type described in my application referred to above.
Figure 8:
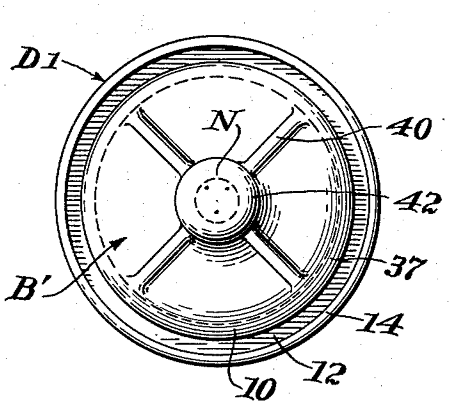
Figure 8 is a top plan view of a modified form of nursing device having the characteristics of the present invention, showing the device in its distended condition.
Figure 9:
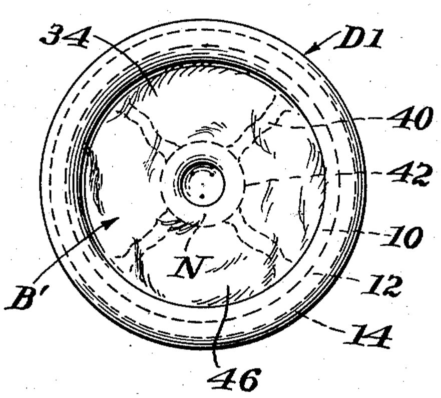
Figure 9 is a bottom plan view of the device of Figure 8, showing the same in its collapsed condition.

As shown in Figure 5, a container 20 of film-like material (such as cellophane) can be wrapped around the outer face of the rubber flange 14 of the nursing device (that is, the nursing device may be inserted into the open end of the container material) and thereafter, a substantially crcular metal or plastic ring or band 18 may be gripped around the flange 14 holding the upper edge of the container 20 in sealing engagement with said flange 14, the ends of the clamping ring 18 being pulled together in any suitable manner as by the conventional latching device 22 (such as commonly used on galoshes and fruit jars) shown in Figure 7. When the elements have been assembled as in Figure 5, and when the band 18 is locked around the assembly, the upper edge of the container 20 is firmly held and the rubber flange 14 acts as a gasket to insure a tight seal, it being obvious that the flange 14 may be compressed to the desired degree against the inner ring 16, the latter providing the necessary rigidity to make the seal effective. It will be understood that the various elements described may be modified to a considerable extent. For instance, various other forms of latching or locking devices for the outer ring 18 may be provided, or, said outer ring may comprise a closed circular band of such diameter that it can be wedged by sliding action over the flange 14 to grip the upper edge of the container 20 thereto. Similarly, it is within the scope of the invention to provide an outer ring 18 of elastic material, such as in the nature of a rubber band, which could be positioned around the flange 14 gripping the container edge 20 and which would contract by reason of its own elasticity to complete the seal. With any of these arrangements, it will be understood that the container portion of the unit may be filled through an opening adjacent the bottom of the container, for instance, as disclosed in Patent No. 2,460,329, dated February 1, 1949.

Referring again to Figure 5, it will be noted that the nipple N is thick enough at its head adjacent the openings 30 to be substantially rigid, but that the section of said head rapidly reduces in thickness below its end to a point approximately at 34, where it flares outwardly. At this point the nipple merges into the breast portion, the material of the latter being of membrane-like thinness, and in the case of rubber, this material is sufficiently thin to approach translucency at a zone adjacent the point 34 or a slight distance outwardly thereof. From the zone 34 to a zone 37 adjacent the inner flange 10, the rubber or similar material is of extreme thinness, or of membrane-like character, so that it offers very little resistance to flexing movement inwardly and outwardly. In fact, the membrane may be made so thin that, in itself, it is incapable of supporting the device, including the nipple, in its distended condition, and the device will tend to collapse toward the mouth of the container when no nursing pressure is applied thereto. I am aware that prior patents relating to devices of this character have suggested making certain portions of a nipple of thinner rubber in order to permit outward pull on the nipple by the nursing baby. In most of these patents, however, the thinness referred to is only relative, and the so-called thin portion is of sufficient rigidity to form a part of a dome-like structure which extends outwardly in the general manner disclosed in Figure 5 at all times. It will be understood that in the case of my devices, the material of the areola portion is so thin that, in itself, it is substantially incapable of supporting the nipple in its distended position, whereby the nipple tends to assume collapsed relation toward the mouth of the container when not in use. While these prior patents may mention a thinner zone or wall, they do not provide for easy yielding outward movement of the nipple, for the rubber must be stretched length-wise to pull the nipple outwardly, rather than merely moving a thin sheet of rubber through an unfolding like action as in the case of my invention as is apparent from successive comparison of Figures 3, 4, and 5. These prior art patents do not provide for the nipple normally being collapsed substantially within the outer edge of the bottle (which would be the equivalent of the outer edge of the ring 16 in the present application), so that it may be easily pulled outwardly by the lips of the baby to an extent to elongate the nipple without necessarily stretching the thin rubber, at least when assuming the initial positions as illustrated by Figure 4, although the membrane is thin enough to permit the baby to actually stretch the rubber of the breast portion B of the device in order to take more of the nipple into his mouth after the device has reached the condition shown in Figure 5. However, as to this feature of my invention, whereby the infant may elongate the nipple at will, it will be understood that he may draw the loose relatively relaxed membrane of the breast portion into his mouth to form an elongation of the nipple without substantially stretching the material thus drawn in at least in positions of distention up to that of Figure 5, the lips of the baby engaging the areola portion acting to define the size of the nipple.

By reason of the tapering cross section of the lower nipple portion, as shown at 32 in Figure 5, the length of that portion of the device which is compressed by the baby into nipple form is variable. That is, he may enclose as much of the nipple in his mouth as his size permits, the tapering portion 32 forming substantially cylindrical wall extensions of the nipple within his mouth. In fact, with the baby's lips at about the zone 34 of Figure 5, the sucking action of the nursing operation may cause some stretching of the thin membrance adjacent the zone 34 to elongate the substantially cylindrical portion of the nipple within the baby's mouth. Stated in another way, while the portion B of the device may normally be considered as the areola portion, large or strong babies may be able to exert such suction on the nipple N as they draw some of the areola membrane B into the mouth to form a substantially cylindrical elongation of the nipple portion within the baby's mouth.

Figure 2:
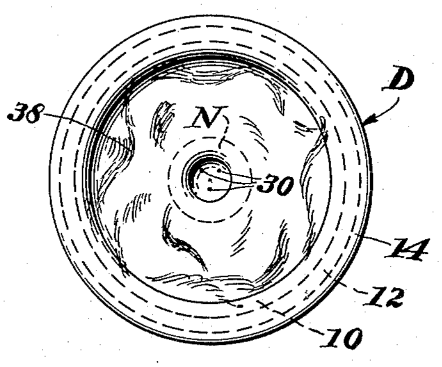
Figure 2 is a bottom plan view of this nursing device in its collapsed condition.
Figure 3:
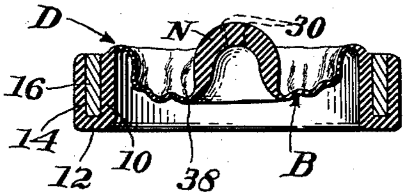
Figure 3 is a transverse sectional view of this nursing device in its fully collapsed condition.
Figure 4:
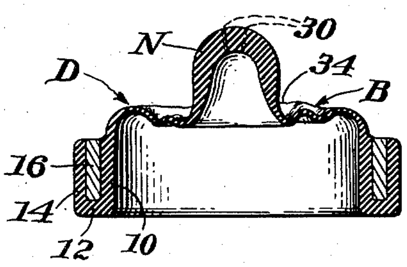
Figure 4 is a similar transverse sectional view of this nursing device in its partially collapsed condition, indicating the condition which the device would assume when a baby of medium size or strength is nursing.
Figure 6:
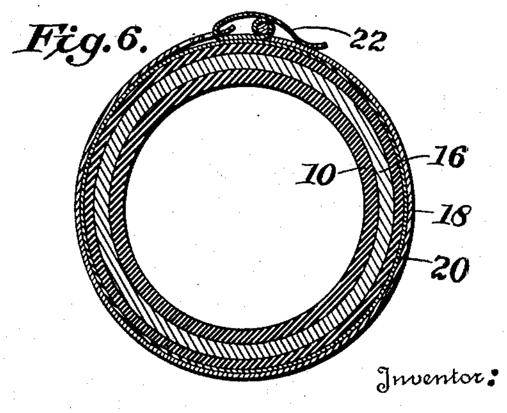
Figure 6 is a horizontal sectional view taken along the line 6—6 of Figure 5.

Referring to Figure 3, it will be noted that when the device is in fully collapsed condition, the end of the nipple may drop within or may be only slightly above the outer edge of the ring 16 (corresponding to the lip of the bottle in more conventional constructions), and the areola portion of the device will form loose folds within the ring 16, for instance, as shown at 38, and these folds may be either regular or irregular as generally indicated in Figures 1 and 2. A young or weak infant would nurse from this device by simply clasping the nipple N in its condition and position of Figure 3, and he would take only the end of the nipple within his mouth. However, a more vigorous child would exert considerably more force of suction on the nipple and would be able to draw it outwardly to the approximate position and condition of Figure 5, it being apparent that the device can assume various intermediate conditions. Throughout the movements of the device between the Figure 3 condition to that of Figure 4, no excessively strong pulling action on the part of the baby would be required, as the areola membrane B merely unfolds or straightens out in response to the force applied. In a similar manner, an older and stronger child may pull the nipple and further elongate the same to the condition of Figure 5, the movements of the material between these positions constituting further unfolding or straightening of the material, rather than a stretching thereof, although as previously mentioned, actual lengthwise stretching of the thin portion of the membrane is possible in the case of a very vigorous child who desires to take a greater length of nipple into his mouth. It should be emphasized, in connection with the comparison of Figures 3, 4, and 5, that the infant may actually elongate the nipple portion which extends into the mouth, as he exerts a greater pull, in addition to unfolding the areola portion B between its collapsed to its fully distended conditions as illustrated in Figures 3 through 5.

It will also be evident to those concerned with devices of this character, that any form of sanitary cover may be temporarily placed over the entire exposed end of the device, such as a cup-like cover, when the device is in the collapsed condition illustrated in Figure 3.

Referring now to Figures 8 through 11, a modification of the invention is generally indicated as D1. This device has the same outer thickened rim, and may be equipped with the same sealing means for attachment to the container 20 or with a more conventional rim construction for attachment to the ordinary rigid glass bottle. The nipple N is of substantially the same tapering thickness as described in connection with Figure 5. However, the areola portion of this nipple, in addition to thinning out as at 34 to form a membrane-like flexible circular area, has spaced thickened rib portions 40 which extend from near the thickened outer zone 37 up to a point approximately at 42 where these ribs merge with the relatively thickened nipple portion N.

While I have illustrated only the fully collapsed condition of this device (Figure 11) and the substantially fully distended condition thereof (Figure 10) it will be understood that the action of this device in use will be generally similar to that described in connection with the first discussed embodiment, and that the device is adapted to assume intermediate positions, for instance, a position comparable to that of Figure 4. The ribs 40 may be of the same curvature as the surface of the thin areola portion B1, or they may be of reduced curvature as shown in Figure 10 in order to provide a practical limit to the distention of the nipple, and to limit the degree to which the baby may elongate the nipple portion of the device as previously described.

One of the principal functions of the ribs 40 is to provide some directional stability for the nipple, and to insure that it is at all times presented substantially centrally of the end of the container, the ribs being heavy enough to prevent the nipple from falling to one side or the other. In addition, the ribs 40 provide increasing resistance to the elongation of the nipple when it has been distended substantially to the condition of Figure 10, and if the nipple is pulled substantially beyond this condition, the longitudinal elasticity of the ribs tend to return the nipple at least to the condition of Figure 10. Furthermore, the ribs 40 will prevent pulling the nipple N too far outwardly, as by hand, and to this extent they serve as a strengthening support for the relatively thin membrane of the areola portion B to preclude stretching it outwardly to the breaking or tearing point.

Figure 10:
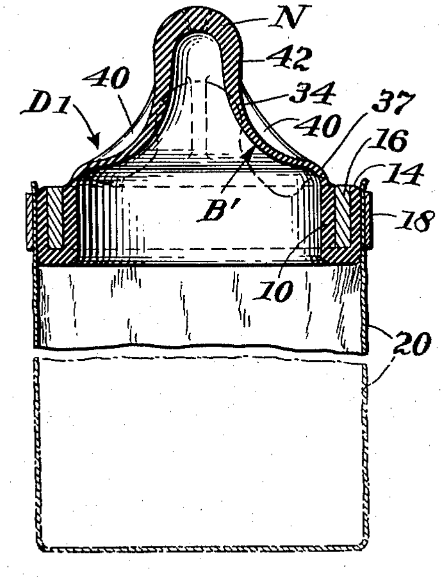
Figure 10 is a transverse sectional view of the device of Figure 8 in its fully distended condition.
Figure 11:
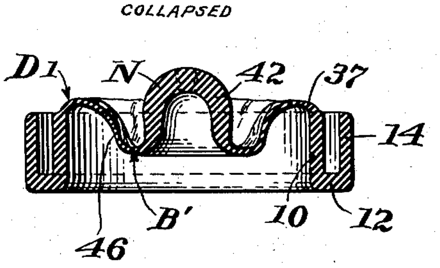
Figure 11 is a similar transverse sectional view, showing the device of Figure 10 in its fully collapsed condition.
Figure 12:
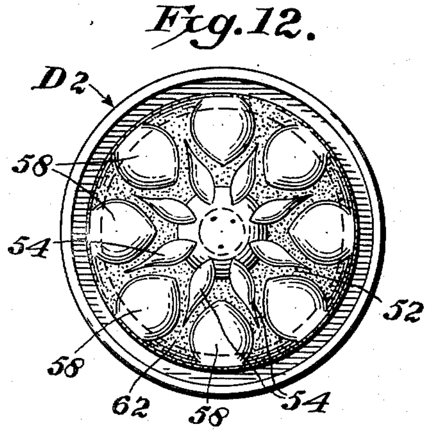
Figure 12 is a top plan view of a further modification of the invention, showing the device in its fully distended condition.

As shown in Figure 11, the nipple of this device may likewise tend to collapse toward the interior of the end of the container, and when so collapsed, the ribs 40 may bend and fold, and the membrane will become more or less irregularly folded as at 46. As in the case of the first-described embodiment of the invention, the movement of the nipple from its collapsed to its distended position is substantially one of unfolding of the material of the areola portion of the device, rather than physical elongation of the rubber of said areola portion, but there may be stretching of the membrane in the case of a very vigorous baby when the device has been pulled to or slightly beyond the distended condition as illustrated in Figure 10, as will be understood from the description of the first-mentioned embodiment. Similarly, and depending on the size or the strength of the baby, more material or rubber may be drawn into the nipple portion of the device as desired by the baby, and as in the earlier described embodiment, membrane which might normally form the areola portion may be drawn into the nipple portion to elongate the latter, and this material may be gradually returned to the areola portion as the baby instinctively desires when he reduces the vigor of his nursing action.

It will further be apparent that the ribs 40 may not only provide a practical limit to outward pulling of the nipple, but they also provide arch-like strengthening members for the device which will preclude excessive collapsing of the inner walls of the nipple portion, and hence, if the baby bites the nipple so that its inner walls substantially engage one another, the ribs 40 will tend to return the body of the nipple to its practical open condition as shown in Figure 10, thus avoiding any interference to the comfortable flow of milk from the outlets in the nipple.

Referring to Figures 12 through 15, still another form of the invention is disclosed, which is similar in principle to the previously described forms although somewhat dissimilar in appearance. As in the case of the previously described embodiments, the outer rim of the device may be attached to a film-like container 20 in the same manner as is described in connection with Figure 5, or the rim may be formed in a more conventional manner in order to attach to such as the ordinary glass nursing bottle.

Figure 13:
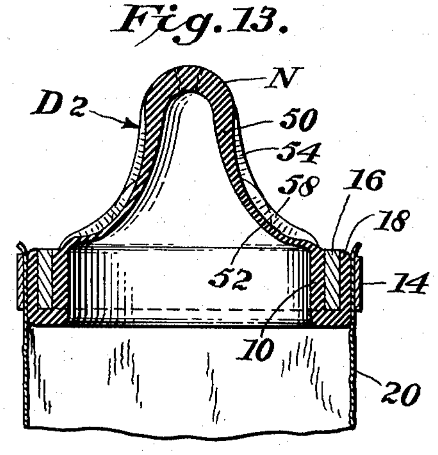
Figure 13 is a transverse sectional view of the nursing device of Figure 12, showing the same in its fully distended condition.

Referring to Figure 13, it will be noted that the wall of the nipple N thins out somewhat rapidly as at 50 and that the main areola portion is of very thin membrane-like rubber out to the point where it connects with the inner rim flange 10. Throughout the rubber wall of the device, and preferably on the outside thereof, there is a series of systematically arranged separate and spaced thickened portions of rubber. In the design illustrated in the drawings, there is a series of downwardly and inwardly diverging thickened portions 54 which extend from the nipple N a substantial distance toward the outer flange of the device, providing spaced zones of the thin membrane like material, which zones widen outwardly in accordance with the narrowing and diverging of the thickened portions 54 as indicated in Figure 4. Extending radially inwardly and preferably tapering in this direction, there is a similar series of spaced thickened portions 58 whose inner tapered ends extend between the outer tapered ends of the portions 54. There are also spaced zones 62 of the thin membrane-like rubber between the thickened portions 58. It will be understood that the arrangement of the thickened portions just described may be varied, and that the roughened surface they provide simulates the mother's breast adjacent to her nipple, and that this roughened surface assists the baby in obtaining a firm nursing grip.

Figure 15:
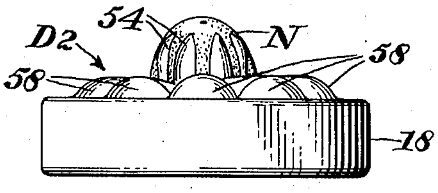
Figure 15 is a side elevational view of this modification of the invention, similar to Figure 14, but with the device in its fully collapsed condition.

When the device of this embodiment is in the collapsed condition as shown in Figure 15, the flexible thickened portions 54 tend to separate and collapse the device. There is also longitudinal relaxation of the membrane portions 56 and 62 which tends to permit the outer ends of the portion 54 to move downwardly into and between the inner ends 60 of the thickened portions 58, the thin membrane assuming a relaxed or, irregularly folded or wavy condition.

Figure 14:
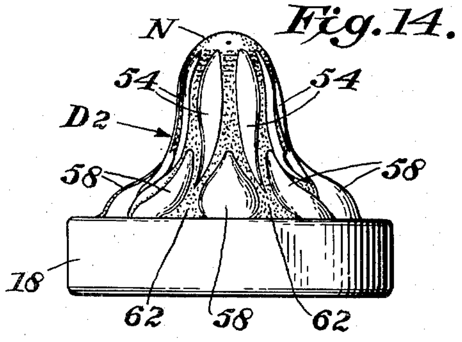
Figure 14 is a side elevational view of the device of Figure 13 likewise showing the device in its fully distended condition.

While only two positions of this device are illustrated in the drawings, i. e., the substantially collapsed position of Figure 15 and the substantially distended position of Figure 14, it will be understood that various intermediate positions may occur when the device is in use, depending on the vigor of nursing of the baby. When the device is in the relaxed condition of Figure 15, the relatively irregular protruding surfaces 54 and 58 are comparable to the somewhat roughened and folded area of the mother's breast prior to nursing. When the baby pulls on the nipple and exerts force tending to elongate the same, the respective series of protruding portions will draw apart in the direction axially of the nipple and will close together circularly of the nipple and areola portion of the device. There will also be a tendency for the outer nipple portions 54 to bend inwardly toward the axis of the nipple, and toward one another, until they more closely approach parallel relationship with one another, and thus the nipple N will be elongated and at the same time reduced in diameter. It will be obvious that the action described is quite comparable to the change in form which takes place in a nursing mother's breast at the nipple and adjacent thereto.

It will be evident that the thickened portions 54 place some limit on the amount of compression or reduction in diameter of the nipple which can take place, for when they contact one another at their edges, no further reduction in diameter of the nipple at a given zone can take place, and hence collapsing of the internal walls against one another is avoided. It will also be noted that in order to compress the nipple portion to a greater extent, it is necessary for the baby to take more of the nipple into his mouth in order to move the remote ends of the portions 54 toward one another.

Figures 16, 17:
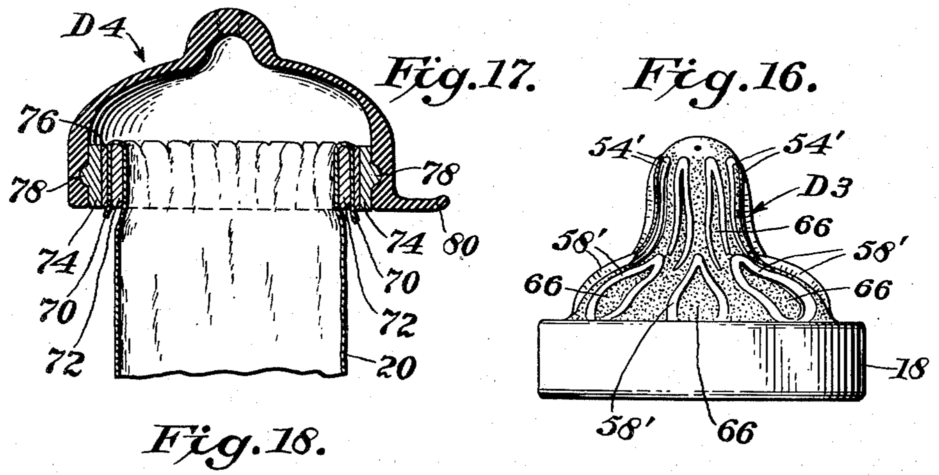
Figure 16 is a view similar to Figure 14 of a variation of the nursing device of Figures 12 through 15.
Figure 17 is a transverse vertical sectional view through an alternative form of means for connecting a flexible container with the nipple.

In Figure 16, a variation of the embodiment of Figure 14 is shown, wherein the portions 54' and 58' may be of horseshoe-like form rather than solid when viewed from the side, and in this embodiment the membrane 66 between the legs of the horseshoe portions will likewise fold and unfold or stretch and relax to facilitate the actions previously described.

In Figure 17, a variation of the connecting means for this or any other types of nursing devices D4 is shown, wherein the upper edge 70 of the film-like container 20 is bent outwardly over an inner substantially rigid band 72, there being an outer band 74 adapted to slip down over the inner band (in the mannfer of crocheting rings) to grip the edge 70 in liquid-tight relation between the bands, the bands being of appropriate relative diameter for this purpose. One or both of the bands may be of rubber-like sealing material, such as the coating 76 shown on the inner face of the outer band 74, and this band may also have a bead as at 78 over which the nipple D4 may be snapped or expanded in sealing relationship for instance, by means of a pull tab 80 of rubber or the like comprising an integral extension of the nipple itself.

With this arrangement, the container may be assembled with respect to the rings as in Figure 17, and then filled from the top, after which time the nipple is stretched over and around the rigid rings to complete the assembly.

Figure 18:
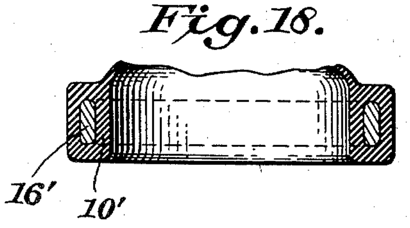
Figure 18 is a fragmentary transverse sectional view of a further modification of the invention.

Referring to Figure 18, instead of having the areola terminate in flanges 10 and 14 defining an intermediate annular space into which may be slipped a continuous circular rigid ring 16, the lower portion of the areola is formed as shown in Figure 18 wherein the ring 16′ of metal, plastic or any other suitable material is embedded within the base 10′ of the nipple, as shown. This is accomplished during the molding or forming and results in a construction wherein the ring 16′ is completely enclosed in the material which forms the base of the nipple, thereby imparting the required rigidity.

While the nursing device disclosed herein may be used in association with a conventional rigid glass bottle or container, it is of pronounced usefulness when connected with a container bag of thin film-like pliant material as referred to herein, which bag is itself collapsible and of such nature as to retract toward the nipple as the contents are withdrawn during nursing, as described in my copending application Serial Number 560,610 referred to above. When these elements are combined, a nursing device results which is characterized by a rigid rim or ring and opposite container and nipple portions both of which are of flexible or collapsible nature. Obviously, the collapsible container facilitates the novel action of the nipple, as described, as it presents little or no resistance to elongation of the nipple by the baby, as described. In fact, the nipple may be flexed inwardly and outwardly to assist the baby during nursing by applying pressure by hand to the container bag.

It will be apparent that I have provided novel forms of nursing devices which closely approach the performance of the human breast. It will be further evident that the various embodiments shown are capable of use by babies of varying age and of different nursing vigor, and that said devices will accommodate themselves to the movements which the baby instinctively imparts during nursing.

The manner in which the container portion 20 is clamped to the nipple or to a neck ring associated therewith as disclosed herein, is claimed in my copending application Serial No. 717,105, filed December 19, 1946, entitled Nursing Outfit.

I claim:

1. A nursing device of rubber or the like comprising a peripheral rim for attachment to a container, a central outwardly presented nipple of relatively thick section and semi-rigid nature, and are areola portion connecting said rim and said nipple and merging into the latter, said areola portion comprising a thin collapsible rubber membrane of such nature as to be substantially incapable in itself of normally supporting said nipple in distended position above the mouth of the container, whereby the relaxation of said areola portion normally permits said nipple to collapse toward the mouth of the container, said membrane permitting a nursing baby to freely draw said nipple outwardly and to elongate said nipple depending on his size and strength.

2. A nursing device of rubber or the like comprising a peripheral rim for attachment to a container, a central outwardly presented nipple of relatively thick section and semi-rigid nature, and an areola portion connecting said rim and said nipple and merging into the latter, said areola portion comprising a thin collapsible rubber membrane of such nature as to be substantially incapable in itself of normally supporting said nipple in distended position above the mouth of the container, said areola portion having integral thickened strengthening areas comprising spaced intermeshing portions which are moved from and between one another when said device is collapsed, whereby the relaxation of said areola portion normally permits said nipple to collapse toward the mouth of the container, while said strengthened areas limit the collapsing movement of said nipple, said membrane permitting a nursing baby to freely draw said nipple outwardly to a degree depending on his size and strength.

3. A nursing device of rubber or the like comprising a peripheral rim for attachment to a container, a central outwardly presented nipple of relatively thick section and semi-rigid nature, and an areola portion connecting said rim and said nipple and merging into the latter, said areola portion comprising a thin collapsible rubber membrane of such nature as to be incapable in itself of normally supporting said nipple in distended position above the mouth of the container, whereby the relaxation of said areola portion normally permits said nipple to collapse toward the mouth of the container, and a plurality of series of circularly spaced thickened portions integral with the membrane of said areola portion, one series of said thickened portions extending from adjacent the outer end of the nipple, and the other series being positioned between the inner ends of the portions of said outer series but spaced therefrom and from one another by areas of the thin membrane of the areola portion, whereby adjacent outer and inner thickened portions can be pulled between one another to distend said device and be permitted to return between one another to collapse said device when nursing is completed.

4. A nursing device of rubber or the like comprising a peripheral rim for attachment to a container, an areola portion of relatively large diameter located within said rim merging into a nipple of relatively small diameter which is presented outwardly from the center of said areola portion, said nipple being of semi-rigid nature and said areola portion immediately adjacent said nipple and where it merges therewith consisting of a thin collapsible rubber membrane of sufficient area when in its relaxed condition to form a plurality of folds between said nipple and said rim including an outwardly bent fold at the base of said nipple and a surrounding reversely bent fold adjacent said rim, said membrane being of such nature as to be normally incapable of supporting said nipple in its distended position beyond said reversely bent fold whereby the relaxation of said areola portion permits said nipple to collapse inwardly within said reversely bent fold, said membrane permitting a nursing baby to freely draw said nipple outwardly toward its distended position by unfolding said membrane material without necessarily stretching said membrane in a direction parallel to its surface.

5. A nursing assembly comprising a container bag and an attached nursing device of rubber or the like having a peripheral rim supported by a substantially rigid neck ring, said nursing device having an areola portion connecting said rim and said nipple and merging into the latter, said areola portion where it merges into said nipple comprising a thin rubber membrane of such nature as to normally permit said nipple to collapse within said rim toward the open end of said container, the membrane material of said areola portion being of sufficient area when relaxed to form folds immediately adjacent to said nipple, whereby a nursing baby may freely pull said nipple outwardly and elongate said nipple by unfolding the membrane material of said areola portion adjacent said nipple, said container bag being of thin film-like pliant material having a closed bottom and an open top end secured in sealing engagement with said rim, said areola portion being of such flexible nature as to unfold outwardly upon application of pressure by hand to the pliant sealed container bag to present said nipple to the baby and to facilitate the nursing action.

6. A nursing assembly comprising a nursing device of rubber or the like and a container bag of thin film-like pliant retractible material having a closed bottom and an open top end secured in sealing engagement with said nursing device, said nursing device having a peripheral rim supported by a substantially rigid annular ring, said nursing device further having a nipple of semi-rigid nature presented outwardly from the center of said rim and an areola portion surrounding and merging with said nipple and extending outwardly within and joining with said rim, said areola portion where it joins said nipple comprising a normally inwardly concave thin membrane of such nature as to cause said nipple to normally retract within said rim toward the open end of said container bag, the membrane material of said areola portion between said nipple and said rim being of substantially greater area than the corresponding overlying annular area between said nipple and said rim in a plane transverse to the axis of said nipple, whereby said membrane material forms folds surrounding said nipple and between the same and said rim when in its relaxed condition, said nipple being adapted to be bodily displaced outwardly and elongated by an unfolding action of the membrane material of said areola portion adjacent said nipple and said areola portion being of such flexible nature as to unfold outwardly upon application of pressure by hand to the pliant sealed container bag to present said nipple to the baby and facilitate the nursing action.

7. A construction in accordance with claim 6 wherein the open end edge area of said container bag extends upwardly through said rigid annular ring and is bent downwardly around the outside of said ring, and wherein said peripheral rim of said nursing device is disposed in surrounding and sealing relationship with respect to said ring and said open end edge area of said container bag.

ADDA M. ALLEN.

REFERENCES CITED

The following references are of record in the file of this patent:

UNITED STATES PATENTS

| Number | Name | Date |
|---|---|---|
| 374,623 | Pease | Dec. 13, 1887 |
| 901,246 | Lyon | Oct. 13, 1908 |
| 1,146,639 | Miller | July 13, 1915 |
| 1,188,115 | Thompson | June 20, 1916 |
| 1,573,519 | Little | Feb. 16, 1926 |
| 1,590,152 | Dreyfus | June 22, 1926 |
| 1,683,246 | Griffiths | Sept. 4, 1928 |
| 2,110,928 | De Buys | Mar. 15, 1938 |
| 2,133,411 | Zohe | Oct. 18, 1938 |

FOREIGN PATENTS

| Number | Country | Date |
|---|---|---|
| 525,389 | Great Britain | Aug. 27, 1940 |

Certificate of Correction

Patent No. 2,517,457 August 1, 1950

ADDA M. ALLEN

It is hereby certified that error appears in the printed specification of the above numbered patent requiring correction as follows:

Column 9, line 59, for the words "and are" read *and an*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*